United States Patent [19]
Galle et al.

[11] Patent Number: 5,468,023
[45] Date of Patent: Nov. 21, 1995

[54] SUBSEA FLOW LINE CONNECTOR

[75] Inventors: Gary L. Galle, Houston; Frank C. Adamek, Pasadena, both of Tex.

[73] Assignee: Abb Vetco Gray Inc., Houston, Tex.

[21] Appl. No.: 148,445

[22] Filed: Nov. 8, 1993

[51] Int. Cl.⁶ .............................. F16L 17/06; F16J 15/02
[52] U.S. Cl. ...................... 285/24; 277/180; 277/235 R; 405/169; 285/368; 285/93; 285/379
[58] Field of Search ........................ 277/180, 235 R, 277/233, 227; 405/169; 285/24, 910, 917, 363, 364, 368, 379, 93

[56] References Cited

U.S. PATENT DOCUMENTS

| | | | |
|---|---|---|---|
| 323,731 | 8/1885 | Phillips | 285/363 |
| 2,513,178 | 6/1950 | Jackson | 285/363 |
| 2,764,311 | 9/1956 | Blackman | 285/917 |
| 3,524,662 | 8/1970 | Tolman | 285/368 |
| 3,542,382 | 11/1970 | Hagmann | 285/363 |
| 3,603,617 | 9/1971 | Lochridge . | |
| 3,717,920 | 2/1973 | Oliver et al. . | |
| 3,930,656 | 1/1976 | Jelinek | 277/180 |
| 4,026,565 | 5/1977 | Jelinek | 277/180 |
| 4,477,205 | 10/1984 | Morrill et al. . | |
| 4,569,539 | 2/1986 | Creedon . | |
| 4,570,981 | 2/1986 | Fournier et al. | 285/910 |
| 4,690,438 | 9/1987 | Kanczareil | 285/910 |
| 5,308,125 | 5/1994 | Anderson, Jr. | 285/379 |
| 5,333,919 | 8/1994 | Nertenberg | 285/363 |

FOREIGN PATENT DOCUMENTS

| | | | |
|---|---|---|---|
| 4020803 | 1/1992 | Germany | 277/180 |
| 783397 | 9/1957 | United Kingdom | 285/379 |

*Primary Examiner*—Eric K. Nicholson
*Attorney, Agent, or Firm*—James E. Bradley

[57] ABSTRACT

A flowline connector will remotely connect subsea flowlines without the assistance of a diver. The flowline connector has a frame which supports a seal carrier plate assembly. Springs allow axial movement of the carrier plate assembly during engagement of mating hubs of flowlines. A metal seal carried by the carrier plate assembly engages conical seats in the hubs of the two flowlines. An elastomeric test seal located radially outward of the metal seal seals between flat faces of the hubs of the flowlines. The test seals elongate radially to wipe the sealing surfaces clean during the makeup.

17 Claims, 4 Drawing Sheets

SUBSEA FLOW LINE CONNECTOR

BACKGROUND OF THE INVENTION

1. Field of the invention

This invention relates in general to sealing between tubular members and in particular to remotely operated connectors for sealing mating hubs of pipelines on a subsea floor.

2. Description of the Prior Art

In offshore oil and gas production, such as in the North Sea, pipelines or flowlines are often laid on the sea floor. For example, satellite fields are connected by the various flowlines to existing production platforms. Often, lines must be connected while subsea. Flexible lines, such as methanol lines, production lines, and water production lines are laid and connected while subsea to corresponding rigid flowlines coming from the production platform. The sea may be too deep for utilizing divers for making the connections.

In the past, tools for making these connections have been bulky and complex because they were required to handle the requirements of pipeline pulling, as well a alignment, connection and sealing. The complexity of the prior art connectors limits the number of connections from a cost or reliability standpoint.

Also, sealing between mating hubs of the flowlines can be a problem because of debris collecting on the faces. There is no easy manner in which a remote operated vehicle can clean the faces prior to sealing.

SUMMARY OF THE INVENTION

A subsea flowline connector is provided, particularly for connecting subsea flowlines without the assistance of a diver. The flowline connector works in conjunction with a flange up tool and a remote operated vehicle (ROV), which handle the gross alignment and pulling in of the flexible flowline into an aligned position with the rigid flowline. The flowline connector remains subsea while the flange up tool and ROV are retrieved.

The flowline connector has a frame mounted on a skid, the frame including two support plates. Each support plate has a hole for one of the hubs of the flowlines to be brought into position, using the flange up tool. A seal carrier mounts to one of the support plates for holding a metal seal in position for sealing between the hubs of the flowline connectors. The means for carrying the seal plate with the frame includes springs, which bias the seal axially toward one of the hubs. The first hub to enter the connector pushes the seal axially in the opposite direction. The second hub to enter the connector then pushes the seal back toward the first hub. A clamp clamps the hubs, with the seal moving to the final position as the hubs are clamped together.

The seal connector also has an elastomeric test seal assembly. The test seal assembly includes two bulk face seals carried on an inner portion of the seal, each seal having a free portion and a secured portion. One of the portions of each test seal is secured to the seal carrier, while the other portion is free to slide relative to the seal carrier. When the hubs of the flowlines are brought together, the hubs deform the test seals, causing the free portions of the test seals to move radially a substantial distance. This wipes a portion of each hub free of debris. Test pressure is applied through the seal carrier to a point between the test seals and the metal seal to test the seals.

DETAILED DESCRIPTION OF THE INVENTION

Figure 1:
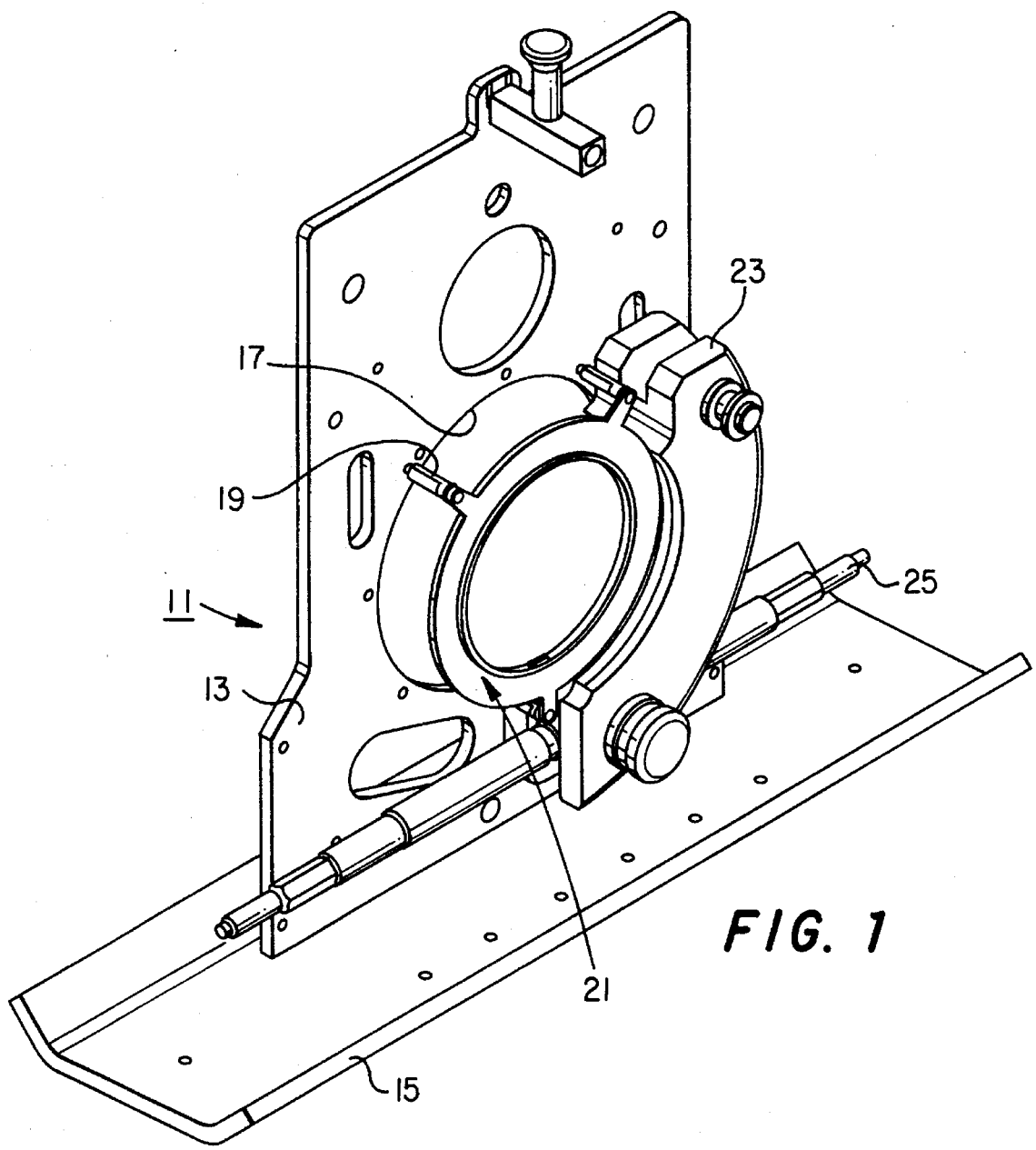
FIG. 1 is a perspective view showing a portion of a flowline connector constructed in accordance with this invention, with portions of the connector removed to illustrate features of interest.
Figure 3:
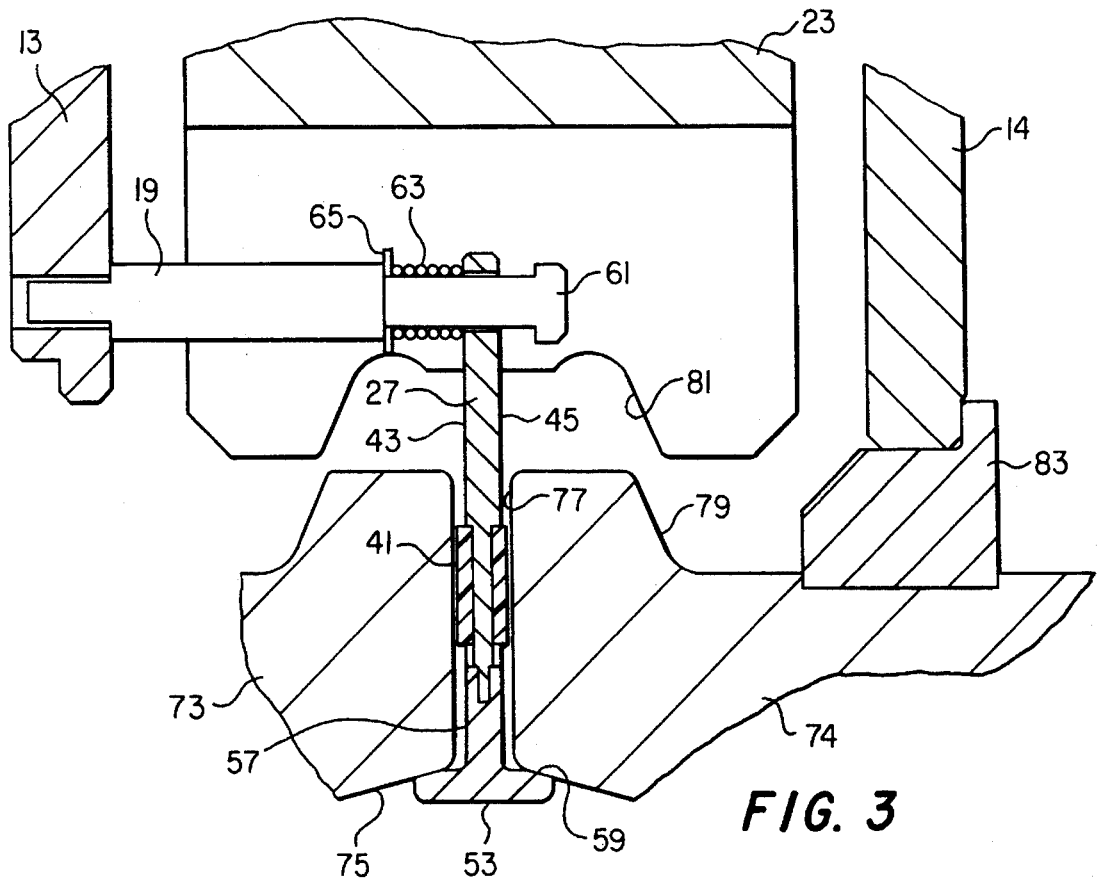
FIG. 3 is an enlarged, partial sectional view illustrating a portion of the flowline connector of FIG. 1.

Referring to FIG. 1, a portion of flowline connector 11 is shown with a number of components removed. Flowline connector 11 includes a frame which has a support plate 13 that extends vertically. Another support plate 14, shown partially in FIG. 3, is parallel to and spaced from support plate 13. Support plates 13, 14 are mounted on a skid 15 which will rest on the sea floor. Each support plate 13, 14 has a hole 17, the holes 17 having a common longitudinal axis.

Three rods 19 extend axially from support plate 13 in a forward direction, with the term "forward" being used arbitrarily herein. Rods 19 are spaced around hole 17, 120 degrees apart from each other. Rods 19 hold a seal carrier assembly 21, which is not shown in detail in FIG. 1. Clamp 23 mounts between the support plates 13, 14. Clamp 23 is segmented, with only one of the three segments being shown in FIG. 1. A drive screw 25 when rotated will cause the segments of clamp 23 to retract for clamping.

Figure 2:
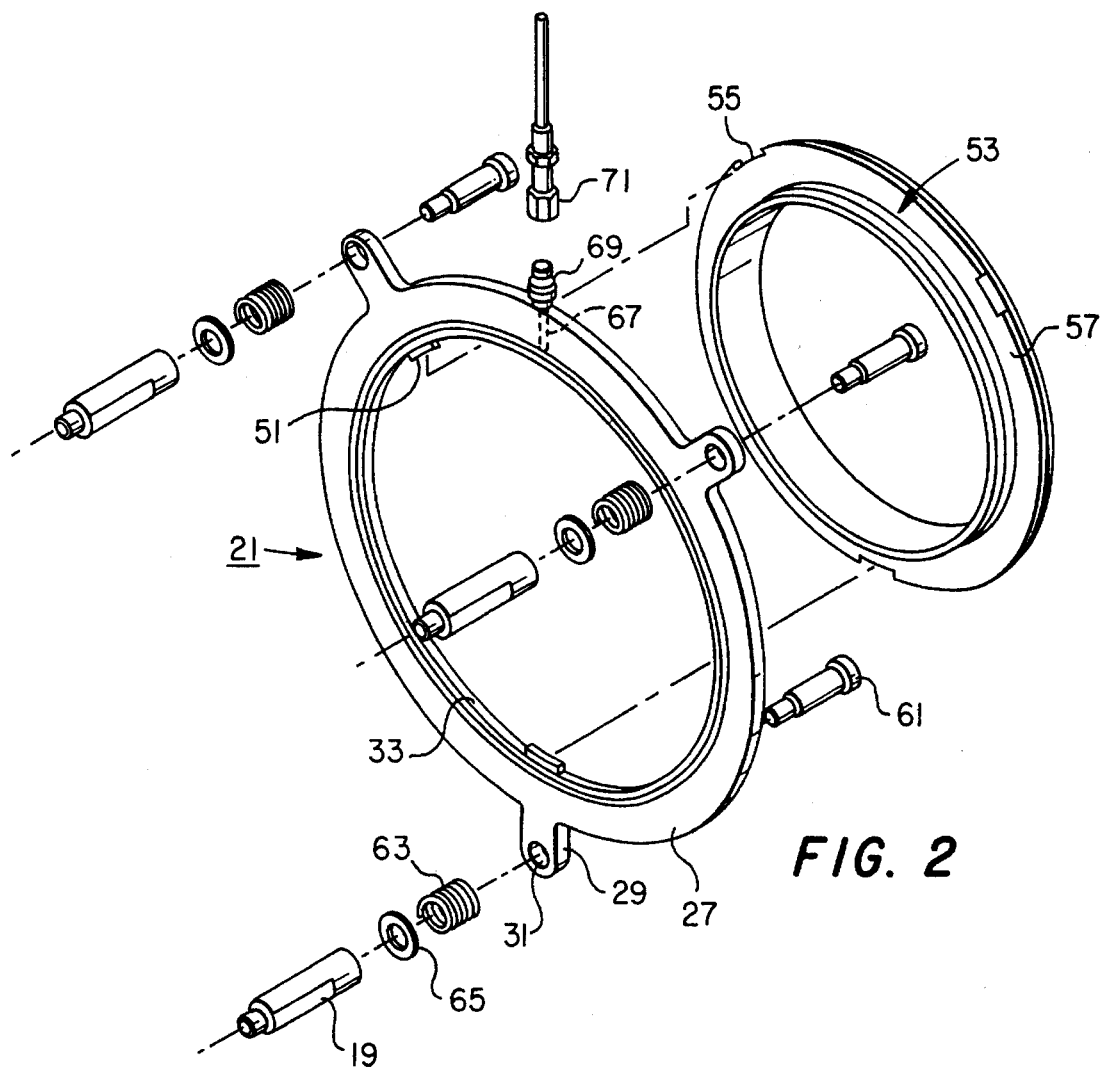
FIG. 2 is an exploded view of the seal carrier and metal seal utilized with the flowline connector of FIG. 1.

FIG. 2 illustrates more details of seal carrier assembly 21. Assembly 21 includes a flat, rigid, metal carrier plate 27 that is circular. Carrier plate 27 has three outer lugs 29, each spaced 120 degrees apart from the other and with an aperture 31 for receiving one of the rods 19. Carrier plate 27 has a central hole 33 which has an axis that will be coaxial with the longitudinal axis of the support plate holes 17 (FIG. 1).

Referring more particularly to FIGS. 3–6, carrier plate 27 has a radial outer portion 35 and an inner portion 37 located radially inward therefrom. The axial thickness of outer portion 35 is greater than the thickness of inner portion 37, resulting in a circumferential edge or shoulder 39 that faces radially inward. A pair of elastomeric test or secondary seals 41 are located on the inner portion 37, each test seal 41 having an outer edge in abutment with the shoulder 39. One of the test seals 41 is on the rearward side 43 of carrier plate 27, while the other test seal 41 is on the forward side 45 of carrier plate 27.

Figure 4:
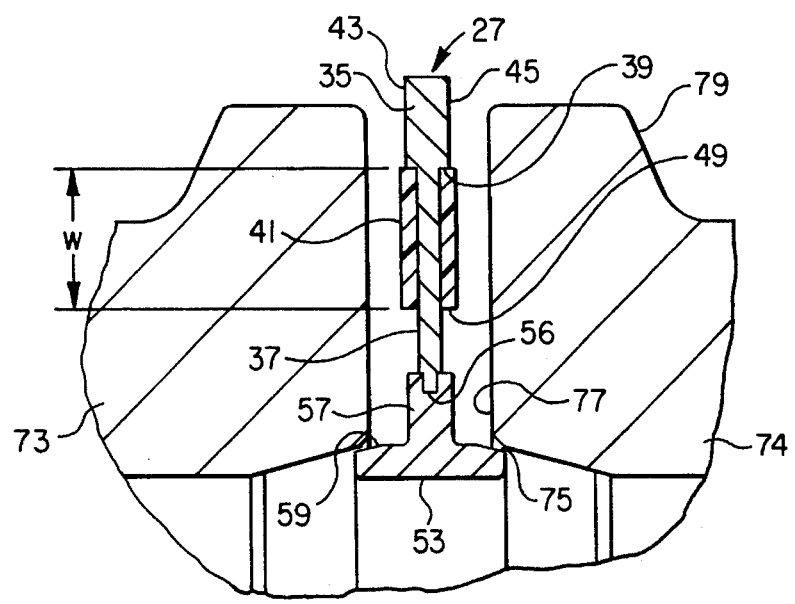
FIG. 4 is another partial sectional view of the flowline connector of FIG. 1, showing the hubs of the flowline spaced apart from each other.
Figure 5:
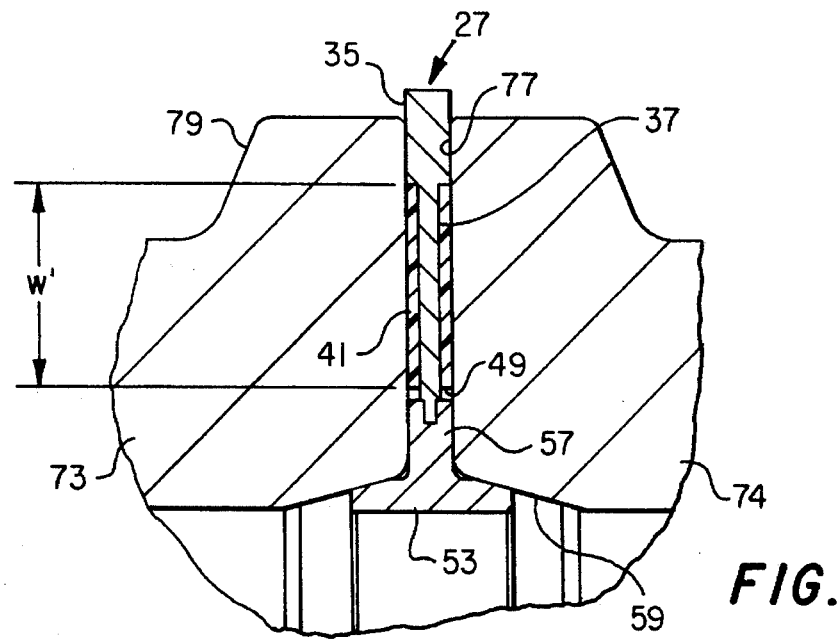
FIG. 5 is a partial sectional view similar to FIG. 4, showing the hubs of the flowline connectors in sealing engagement with each other.
Figure 6:
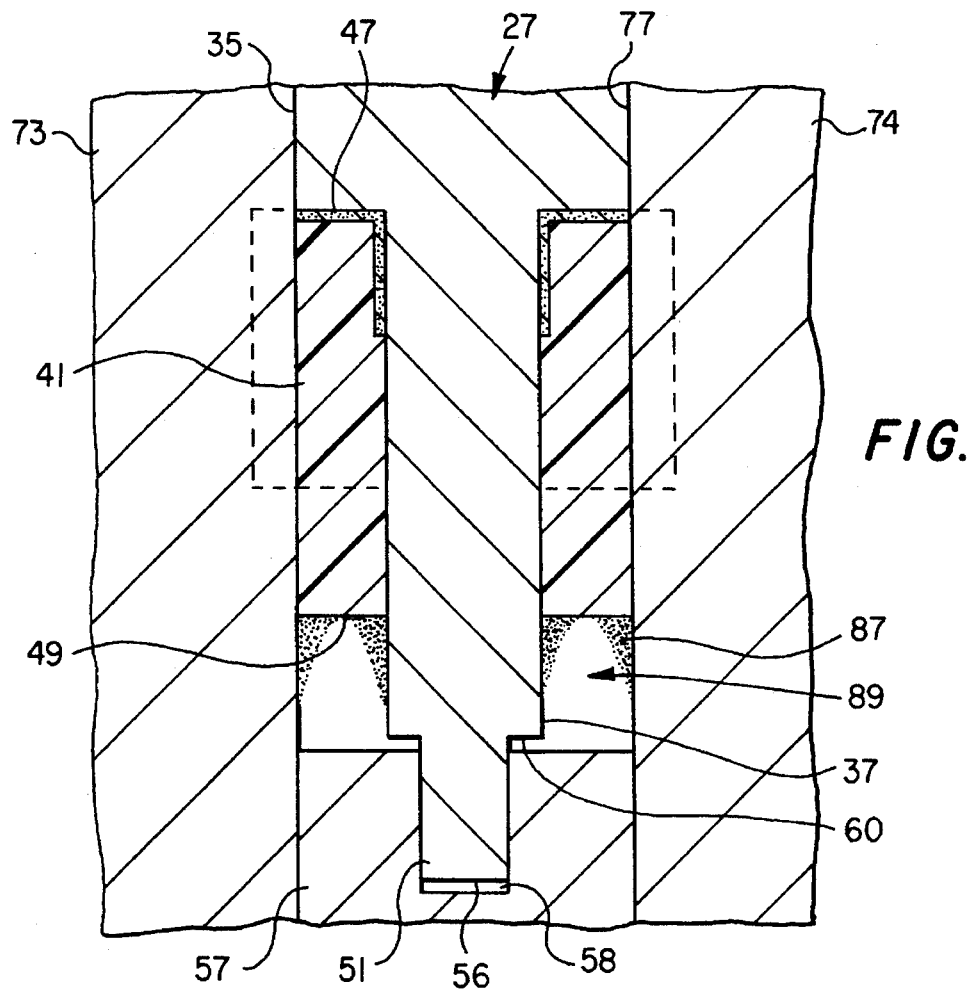
FIG. 6 is a sectional, partially schematic view illustrating the test seals of the seal carrier used with the flowline connector of FIG. 1.

As shown more particularly in FIG. 6, test seals 41 are flat, elastomeric bulk seals, rectangular in transverse cross-section. Each test seal 41 has a secured portion secured by an adhesive 47 to carrier plate inner portion 37 and shoulder 39. The adhesive 47 is illustrated enlarged for clarity, and would not be as thick as shown in FIG. 6. Adhesive 47 is coated on shoulder 39 and extends a short distance radially inward therefrom on inner portion 37, the radial distance being preferably less than about one-fourth the radial dimension W (FIG. 4) of each test seal 41 when in the natural, undeformed condition. The natural, undeformed condition is also shown by the dotted lines in FIG. 6. The bonding of only the outer portion of the test seals 41 enables the inner or free portion, including inner edge 49, to move radially inward relative to carrier plate 27 when deformed as illustrated in FIGS. 4–6.

In the natural undeformed condition, the test seals 41 protrude axially past the outer portion 35 of the rearward and forward sides 43, 45. Preferably, the axial thickness and radial dimension W of each test seal 41 are selected such that in the natural condition, shown in FIG. 4, the radial dimension W is about 30 to 60 percent that of the deformed or elongated radial dimension W' shown in FIG. 5. The axial thickness of each test seal 41 will decrease to about one-half of the undeformed axial thickness when deformed as shown in FIGS. 5 and 6.

Referring again to FIG. 2, carrier plate 27 also has three circumferentially spaced apart inner lugs 51 protruding inward from the circular hole 33. Lugs 51 are used to retain a primary seal 53 within hole 33. Primary seal 53 is metal and has an outer perimeter with three recesses 55, each for engaging one of the lugs 51. Each recess 55 leads to an annular groove 56 extending around the perimeter of metal seal 53 and intersected by recesses 55. Placing lugs 51 in recesses 55, then rotating metal seal 53 relative to carrier plate 27 180 degrees will retain metal seal 53 in place.

The inner diameter of inner lugs 51 is less than the diameter of the base of groove 56, resulting in a clearance 58, as shown in FIG. 6. The outer diameter of metal seal 53 is less than the inner diameter of carrier plate hole 33, as indicated by clearance 60 in FIG. 6. The clearances allows limited radial movement of metal seal 53 relative to carrier plate 27. As shown in FIGS. 3–5, metal seal 53 is T-shaped, having a flange 57 and two conical seal surfaces 59 extending in forward and rearward directions from flange 57. Groove 56 is located in the perimeter or outer diameter of flange 57. Conical seal surfaces 59 face outward.

Referring again to FIG. 2, carrier plate 27 is held on rods 19 by means of shoulder screws 61. Each shoulder screw 61 has a threaded portion that engages a threaded receptacle (not shown) in each rod 19. The shank of shoulder screw 61 passes through the aperture 31, which is larger in diameter than the shank of shoulder screw 61 to allow axial sliding movement of carrier plate 27 relative to shoulder screw 61. The head of shoulder screw 61 is larger in diameter than hole 31. A coil spring 63 is located between each lug 29 and each rod 19. A washer 65 locates between coil spring 63 and rod 19 to serve as a stop. Coil spring 63 urges carrier plate 27 in a forward direction or to the right, as illustrated in all of the figures.

Referring still to FIG. 2, a test port 67 extends radially through carrier plate 27. Test port 67 leads to the carrier plate hole 33 for applying test fluid. A fitting 69 connects test port 67 to a line 71 that can be connected to a source of fluid pressure from an ROV for applying test pressure.

Referring to FIGS. 3–5, carrier plate 27 locates between two flowline metal hubs 73, 74. In the example shown, flowline hub 73 is typically at the end of a flexible line, thus will be referred to as "flexible" hub 73, while flowline 74, on the forward side, is typically the end of a rigid flowline, thus will be referred to as "rigid" hub 74. Each hub 73, 74 has a conical seat 75 for mating with the conical surfaces 59 of metal seal 53. Also, each hub 73,74 has a flat face 77 that is perpendicular to the longitudinal axis of each hub 73, 74.

Face 77 is flat and extends radially outward from conical seat 75. As shown in FIG. 3, each hub 73, 74 has an external lobe 79 which is engaged by lobes 81 of clamp 23. Rigid hub 74 has a reaction ring 83 mounted rigidly to it. Reaction ring 83 will abut forward support plate 14 when flowline connector 11 is brought into initial alignment with rigid hub 74.

In operation, flowline connector 11 with seal carrier assembly 21 installed will be placed on the sea floor adjacent to previously laid flowlines that require connection. Initially, the coil springs 63 (FIG. 3) will push seal carrier assembly 21 in a forward direction with carrier plate 27 abutting against the heads of the shoulder screws 61. Note that in the initial position (not shown), seal carrier assembly 21 is slightly forward in an axial direction of the final position when hubs 73, 74 are in sealing engagement with each other.

The operator will deploy an ROV and a flange up tool (not shown) to first bring flowline connector 11 into engagement with rigid hub 74. Face 77 of rigid hub 74 will contact seal carrier assembly 21. It will push seal carrier assembly 21 to the left or rearward generally to the position shown in FIG. 3. Springs 63 will compress. Clearances 58, 60 (FIG. 6), allow some radial movement of metal seal 53 relative to carrier plate 27 during this initial engagement to assure proper location in the conical seats 75. Reaction ring 83 will abut support plate 14. A locking mechanism (not shown) will then lock flowline connector 11 to rigid hub 74 with reaction ring 83 abutting support plate 14.

Then, the ROV and flange up tool will move the flexible flowline hub 73 forward into the flowline connector 11. Face 77 of flexible hub 73 contacts seal carrier assembly 21, pushing it slightly rearward toward rigid hub 74. The operator will then actuate the drive screw 25 (FIG. 1), causing the segments of clamp 23 to radially contract. Clamp lobes 81 will engage the hub lobes 79, pushing the flexible hub 73 toward the rigid hub 74. The conical surfaces 59 of metal seal 53 will seat and seal in the conical seats 75.

The hub faces 77 will contact and deform the test seals 41, as illustrated in FIG. 6, which are initially protruding forward and rearward from carrier plate 27. The inner edges 49 move radially inward a considerable distance, with the radial dimension of each test seal 41 increasing from W to W', as shown in FIGS. 4 and 5 As the inner edges 49 move radially inward, debris 87 that may have collected on the hub faces 77 and on the carrier plate inner portion 37 is pushed radially inward. The radial elongation of the test seals 41 wipes a portion of the hub faces 77 and the carrier plate inner portions 37 clean. The debris 87 is retained within a cavity 89 located between the outer perimeter of metal seal flange 57 and the test seals inner edges 49.

The dimensions of test seals 41, indicated by the dotted lines in FIG. 6, are selected so that the natural radial thickness W (FIG. 4) will increase significantly to the elongated thickness W' (FIG. 5). However, this thickness is also selected such that cavity 89 will have sufficient size to allow the collection of debris 87. The test seat area that is cleaned by the elongation of test seals 41 is a radial band with a radial extent that is equal to the difference between the elongated radial thickness W' and the natural radial thickness W.

When in the fully sealed position, the hub faces 77 will be contacting the forward and rearward sides of metal seal flange 57. Also, the outer portion 35 of carrier plate 27, which is substantially the same axial thickness as flange 57, may be contacted by the hub faces 77. During the engagement by the clamp lobes 81, some radial movement of metal seal 53 relative to carrier plate 27 may take place due to clearances 58 and 60 (FIG. 6). Also, springs 63 (FIG. 3) allow some axial movement of carrier plate 21 relative to support plates 13, 14, to the final position.

Then, the ROV will connect a source of fluid pressure, such as gas, to test port 67. The fluid flows into the cavity 89 (FIG. 6), and applies an external pressure test on metal seal 53. The test pressure acts between the test seals 41 and the metal seal conical surfaces 59.

Once the testing is completed, the ROV and flange up tool will be retrieved to the surface. The flowline connector 11 stays in place until disconnection of the hubs 73, 74 is desired.

The invention has significant advantages. The elastomeric test seals enable wiping of an area of the hubs that normally collects debris. This allows test pressure to be applied externally of the metal seal so that an external test can be applied before the ROV and flange up tool are removed from the location. The spring biased carrier plate allows compliance movement of the metal seal during the make up of the hubs.

While the invention has been shown in only one of its forms, it should be apparent to one skilled in the art that it is not so limited but is susceptible to various changes without departing from the scope of the invention.

We claim:

1. A seal assembly for sealing between two hubs of a subsea flowline, each hub having a longitudinal axis, a primary seal seat and radially outward therefrom a secondary seal seat, the seal assembly comprising in combination:

a rigid carrier having a hole therethrough and two sides;

a primary seal secured to the carrier within the hole;

a pair of elastomeric secondary seals, one on each side of the carrier, each having a secured portion secured to the carrier and a free portion extending radially from the secured portion and being free to slide relative to the carrier, the secondary seals having axial thicknesses selected such that contact by the secondary seal seats when the hubs are brought together moves the free portion of each secondary seal radially, wiping across a portion of the secondary seal seats, to enhance sealing of the secondary seals.

2. The seal assembly according to claim 1, further comprising test port means extending radially through the carrier for supplying fluid pressure between the secondary seals and primary seal for testing.

3. The seal assembly according to claim 1, wherein an adhesive secures the secured portion of each of the secondary seals to the carrier.

4. The seal assembly according to claim 1, wherein each of the secondary seals has a radial dimension in its natural undeformed condition that is from 30 to 60 percent of its radial dimension in its deformed condition.

5. The seal assembly according to claim 1 wherein:

the carrier has a shoulder on each side that faces radially;

each of the secondary seals has a circumferential edge that abuts one of the shoulders; and an adhesive is located between each of the shoulders and the circumferential edges, securing the secondary seals to the carrier.

6. The seal assembly according to claim 1, wherein the configuration of the secondary seals is selected to provide a cavity for collection of debris between the secondary seals and the primary seal when the hubs are brought together.

7. A subsea flowline connector for connecting and sealing two hubs of a subsea flowline, each hub having a longitudinal axis, a conical metal seal seat and radially outward therefrom a flat test seal seat, the flowline connector comprising in combination:

a frame for holding the hubs in an aligned position with the test seal seats facing each other;

a metal seal having two conical sealing surfaces for sealing against the metal seal seats;

a carrier plate having a hole therethrough and two sides, the metal seal being carried by the plate within the hole;

plate carrying means mounted to the frame for holding the plate between the hubs when in the aligned position;

a pair of elastomeric test seals, one on each side of the plate, each having an inner edge and an outer edge radially outward therefrom, each of the test seals having a secured portion adjacent the outer edge immovably fixed to the plate, allowing the inner edge of each of the test seals to slide radially inward relative to the plate; and clamp means carried by the frame for clamping the hubs together with the metal seal and the plate disposed therebetween, causing the inner edges of the test seals to move radially inward and wipe across a portion of the test seal seats as the hubs are brought together, to enhance sealing of the test seals so that fluid pressure may be applied between the test seals and metal seal for testing the metal seal.

8. The flowline connector according to claim 2, further comprising test port means extending radially through the plate for supplying the fluid pressure between the test seals and metal seal.

9. The flowline connector according to claim 7, wherein the secured portion of each of the test seals is immovably fixed to the plate by an adhesive.

10. The flowline connector according to claim 7, wherein the test seals have a radial dimension and an axial thickness selected to provide a cavity for debris between the inner edges of the test seals and the metal seal when the test seals and metal seal are in sealing engagement with the hubs.

11. The flowline connector according to claim 7, wherein the plate carrying means comprises:

spring means mounted between the frame and the plate for urging the plate toward one of the hubs and for allowing limited axial movement of the plate relative to the frame as the hubs are brought together by the clamp means.

12. The flowline connector according to claim 7, wherein the plate carrying means comprises:

a plurality of rods mounted to the frame and extending axially therefrom;

a plurality of apertures in the plate for sliding over the rods; and a coil spring mounted over each rod between the plate and the frame for urging the plate toward one of the hubs and for allowing limited axial movement of the plate relative to the frame as the hubs are brought together by the clamp means.

13. A subsea flowline connector for connecting and sealing two hubs of a subsea flowline, each hub having a longitudinal axis and a primary seal seat, the flowline connector comprising in combination:

a frame for holding the hubs in an aligned position facing each other;

a primary seal for sealing against the seal seats;

a plate having a hole therethrough, the primary seal being carried by the plate within the hole;

clamp means carried by the frame for clamping the hubs together with the primary seal and the plate disposed therebetween; and plate carrying means mounted between the frame and the plate for holding the plate between the hubs when in the aligned position, for urging the plate toward one of the hubs, and for allowing limited axial movement of the plate relative to the frame as the hubs are brought together by the clamp means.

14. The flowline connector according to claim 13, wherein the plate carrying means comprises:

a plurality of rods mounted to the frame and extending axially therefrom;

a plurality of apertures in the plate for sliding over the rods; and a coil spring mounted over each rod between the plate and the frame for urging the plate toward one of the hubs and for allowing limited axial movement of the plate relative to the frame as the hubs are brought together by the clamp means.

15. A method for sealing between opposed faces of mating tubular members which have a common longitudinal axis, comprising:

providing a rigid carrier;

mounting at least one elastomeric seal to the carrier such that the elastomeric seal has a secured portion secured to the carrier and a free portion extending radially from the secured portion and being free to slide radially relative to the carrier;

positioning the carrier between the faces and moving one of the faces into engagement with the elastomeric seal, deforming the elastomeric seal and causing the free portion to move radially to wipe a portion of said one of the faces to enhance sealing.

16. The method according to claim 15 wherein the step of mounting the elastomeric seal to the carrier comprises placing an adhesive between the carrier and the secured portion of the elastomeric seal.

17. A method for sealing and testing between two hubs of a subsea flowline, each hub having a longitudinal axis, a primary seal seat and radially outward therefrom a test seal seat, the method comprising:

providing a primary seal;

providing a plate having a hole therethrough and two sides;

securing a secured portion of an elastomeric test seal to each side of the plate while leaving a free portion of each of the test seals free to slide radially relative to the plate;

securing the primary seal to the hole in the plate and positioning the plate, primary seal, and test seals between the hubs;

clamping the hubs together, deforming the test seals between test seal seats, causing the free portions of the test seals to slide radially across a portion of the test seal seats as the hubs are brought together to clean the test seal seats, and sealing the primary seal against the primary seal seats; then applying fluid pressure between the test seals and the primary seal to test the primary seal.

* * * * *